US007570642B2

(12) United States Patent
Lavigne et al.

(10) Patent No.: US 7,570,642 B2
(45) Date of Patent: Aug. 4, 2009

(54) METHOD AND APPARATUS FOR COMPUTING, STORING, AND MULTIPLEXING MODIFIED BYTES IN A PACKET ROUTER

(75) Inventors: Bruce E. Lavigne, Roseville, CA (US); Lewis S. Kootstra, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1163 days.

(21) Appl. No.: 10/092,155

(22) Filed: Mar. 5, 2002

(65) Prior Publication Data

US 2003/0169737 A1    Sep. 11, 2003

(51) Int. Cl.
*H04L 12/28* (2006.01)
(52) U.S. Cl. .................. 370/392; 370/474; 370/476; 711/155; 711/202
(58) Field of Classification Search .......... 370/392; 711/202, 155
See application file for complete search history.

(56) References Cited

U.S. PATENT DOCUMENTS

| 4,869,259 | A | * | 9/1989 | Elkins | 600/458 |
| 6,006,330 | A | * | 12/1999 | Soni | 726/3 |
| 6,141,348 | A | * | 10/2000 | Muntz | 370/392 |
| 6,571,291 | B1 | * | 5/2003 | Chow | 709/230 |
| 6,980,552 | B1 | * | 12/2005 | Belz et al. | 370/392 |
| 7,016,351 | B1 | * | 3/2006 | Farinacci et al. | 370/392 |
| 7,206,327 | B2 | * | 4/2007 | Lorek et al. | 370/503 |
| 2005/0169272 | A1 | * | 8/2005 | Lo et al. | 370/392 |

* cited by examiner

*Primary Examiner*—Chi H. Pham
*Assistant Examiner*—Shick Hom

(57) ABSTRACT

A method for generating a modified packet for output from a router. First, a received packet is stored in one memory location. Modified bytes corresponding to the received packet are computed and stored in a separate memory location. The modified packet is generated by multiplexing between select unmodified bytes of the received packet with the modified bytes.

16 Claims, 5 Drawing Sheets

METHOD AND APPARATUS FOR COMPUTING, STORING, AND MULTIPLEXING MODIFIED BYTES IN A PACKET ROUTER

TECHNICAL FIELD

The present invention pertains to an apparatus and method for computing, storing, and multiplexing modified bytes in a packet router.

BACKGROUND ART

Businesses and individuals rely upon the Internet and various communications networks for exchanging data electronically. Computers, personal digital assistants, and other types of mobile communication devices coupled to the Internet, enable users to readily gain access to and exchange data of all types (e.g., sound, text, numerical data, video, graphics, multi-media, emails, etc.) with other computers, databases, websites, etc. Now, users can participate in live discussions in chat rooms, play games in real-time, watch streaming video, listen to music, shop and trade on-line, download files, etc. And given the requisite bandwidth, it is possible to provide video-on-demand, HDTV, IP telephony, video teleconferencing, and other types of bandwidth intensive applications.

At the core of networking technology lies the fundamental proposition of digitizing the data into a string of bits comprised of one's and zero's. The digital data is divided into groups known as "packets." Embedded within each packet are various addresses mandated by an Internet Protocol (IP). These IP addresses are analogous to a postal letter's return address and recipient address in that the IP addresses provide information on how the packets are to be forwarded. Routers coupled to various nodes of the network, examine the packets and route the packets based on their IP addresses. During transmission, a packet can be routed via multiple intermediary routers before reaching its final destination. In this manner, packets are separately transmitted and routed through the network until they eventually reach their intended destination.

Each time a router examines a packet and subsequently routes the packet to a different location, it must first essentially modify that packet. Specifically, the router must modify the Destination Address (DA), the Source Address (SA), the Time-to-Live (TTL), and the Checksum. One way by which this is commonly done today entails the use of software. A computer program takes the packet, modifies it, and then sends out the modified packet. Although this software approach is straightforward, it is relatively time intensive. Given that routers are being designed to route millions of packets per second, even the slightest incremental delay incurred while routing a packet can result in severe aggregate performance degradation.

In an effort to improve performance, some router manufacturers have implemented hardware designs. Rather than running software on a generic processor, these manufacturers have customized circuitry specifically designed to handle the requisite packet modifications. The specialized hardware reads the old values, computes the new values, writes the new values back to the packet memory, and then sends the modified packet out. One disadvantage to this hardware approach is that the additional circuitry increases complexity and resultant cost. Additional die space is necessary to fabricate the hardware design. A bigger chip directly translates into increased production costs. Furthermore, rewriting the packet memory prior to the packet being sent, requires the addition of more write ports or packet buffers to temporarily hold the packet data. This adds to the complexity and cost. And although the packet modifications can be computed on-the-fly by hardware, the associated latency can detrimentally impact its performance. Of course, this latency can be effectively masked through the use of pipelining techniques. However, the trade-off is that pipelining entails additional logic which, in turn, leads to increased production cost. This is especially the case with using pipelining to modify packets; a deep pipeline is needed in order to compute the Checksum because the Checksum must cover the entire portion of the packet being modified. Deep pipelines consume valuable chip space and can significantly increase the cost of the router.

Therefore, there are various disadvantages inherent to the prior art networking methods used to modify packets in routing.

SUMMARY OF THE INVENTION

A method and apparatus are disclosed for generating a modified packet for output from a router. First, a received packet is stored in one memory location. Modified bytes corresponding to the received packet are computed and stored in a separate memory location. The modified packet is generated by multiplexing between select unmodified bytes of the received packet with the modified bytes.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

The present invention relates to an apparatus and method for computing, storing, and multiplexing modified bytes in a packet router. In one embodiment, when a packet is received, the entire packet is stored in a packet buffer. The router identifies the locations of the fields within the packet which need to be modified. For each of these fields, new modified bytes of information are computed. The modified bytes are stored in a separate, dedicated memory. When a packet is sent out of the router, a multiplexer selectively outputs either the original bytes from the packet buffer or the modified bytes from the dedicated memory. The multiplexer makes its selection based on the location of the fields to be output. For instance, if the location of the field indicates that it need not be modified, the multiplexer selects the original bytes corresponding to that particular field contained in the packet buffer for output. But on the other hand, if the location of the field indicates that it needed to be modified, the multiplexer selects the modified bytes corresponding to that field contained in the dedicated memory for output. Thereby, the present invention enables packets to be output on-the-fly at extremely high data rates without the need for complicated, expensive pipelining stages. Furthermore, the present invention does not require additional write ports or extra packet buffers.

Figure 1:
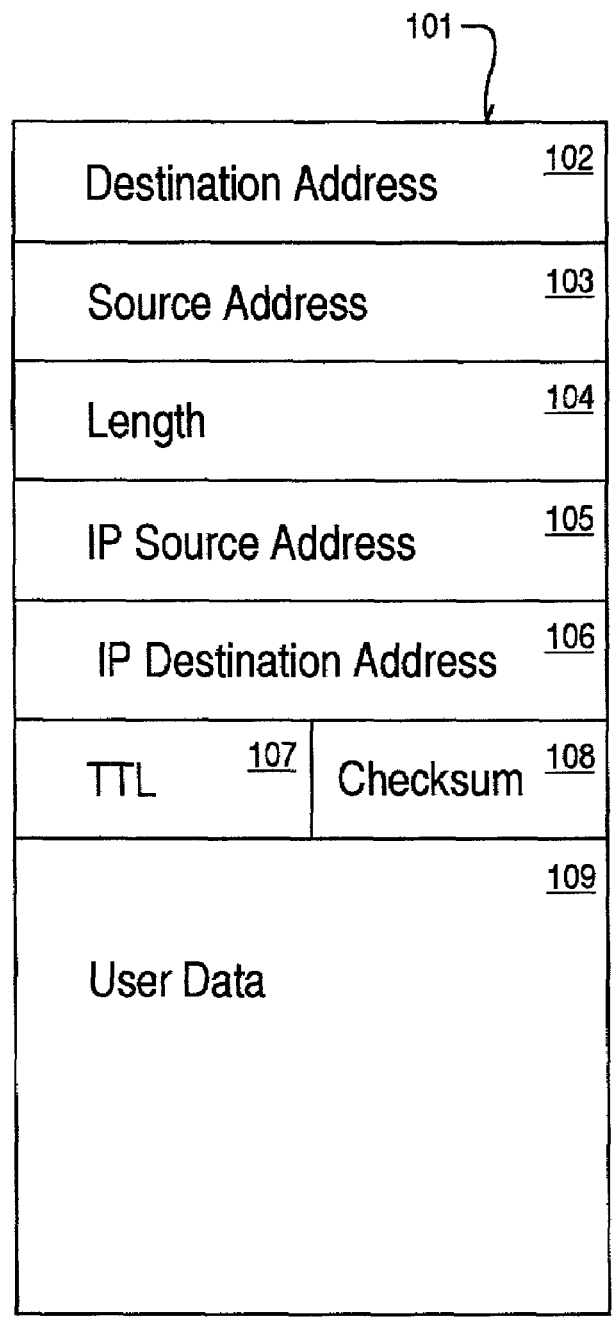
FIG. 1 shows an exemplary packet and its associated fields.

An example is now offered to describe one embodiment of the present invention in detail. Referring to FIG. 1, an exemplary packet and its associated fields is shown. It can be seen that packet 101 contains a number of different fields. In particular, packet 101 includes a Destination Address field 102, a Source Address field 103, a Length field 104, an IP Source Address 105, an IP Destination Address 106, a Time-to-Live field 107, a Checksum field 108, and a User Data field 109. The locations of each of these fields are specified according to a TCP/IP protocol. As such, the specific locations of each of the fields are pre-determined and known. In addition, the TCP/IP protocol specifies that several of the fields must be modified before the packet is allowed to be output by the router. In particular, the bytes of information contained in the Destination Address field 102, the Source Address field 103, the Time-to-Live field 107, and the Checksum field 108 must be modified in order for the packet to be properly routed. The Destination Address field 102 contains information that specifies the address of the next node to which the packet is being sent. This value is changed as the packet is forwarded from one node to the next. The Source Address field 103 contains information that specifies the address of the node that is sending the packet. Again, this value is updated as the packet is routed through various nodes of the network. The Time-to-Live (TTL) field 107 is designed to prevent packets from running in loops. Every router that handles a packet subtracts one from the packet's TTL. If the TTL reaches zero, the packet has expired and is discarded. As such, the value in the TTL field 107 must be modified by each router. The Checksum field 108 is used for error correction. It contains a checksum value which is representative of a running total based on the byte values transmitted in the packet. The receiver compares checksums to determine whether a transmission was error-free. And because other fields in the packet need be modified, the checksum value must correspondingly be modified as well.

Other fields, such as the Length 104, IP Source Address 105, the IP Destination Address 106, and User Data 109 fields also have fixed, predetermined locations which are known. However, the information in these fields remain the same throughout the entire transmission process. For instance, the IP Source Address field 105 contains an address which uniquely identifies the sending device. This remains constant. Likewise, the address contained in the IP Destination Address field 106 remains constant because it uniquely identifies the intended receiving device. The Length field 104 contains a value which specifies the length of the packet. Some packets may have more user data, whereas other packets may have less user data. In any case, the length of the packet does not change throughout the transmission. And it is important to maintain the same user data contained in the User Data field 109.

As described above, the entire packet is initially stored in a packet buffer. In other words, the information contained in fields 102-109 are all stored in the packet buffer. However, the router computes a new value for each of the Destination Address 102, Source Address 103, Time-to-Live 107, and Checksum 108 fields. These new values can be several bytes wide. For example, the Destination Address and Source Address can be four, six, or more bytes wide. All of these newly computed values are stored in a dedicated memory separate from that of the packet buffer. When the packet is ready to be sent, a multiplexer selects between the packet buffer and the dedicated memory. Basically, the multiplexer is a switch that switches between original bytes stored in the packet buffer and the newly computed bytes stored in the dedicated memory. The selection is based on the particular field.

For instance, the packet header starts with the Destination Address field 102. Consequently, the multiplexer initially selects the bytes from the dedicated memory for forwarding. These bytes correspond to the newly computed destination address. It should be noted that the multiplexer does not select the bytes of the destination address stored in the packet buffer. Thereby, the old destination address is properly discarded. The next field is the Source Address field 103. Again, the multiplexer selects the dedicated memory from which to forward bytes of information. These bytes represent the newly computed source address. And the original source address from the packet buffer is discarded. When the Length field 104 is encountered, the multiplexer switches and selects the information contained in the packet buffer corresponding to the length of the packet. And due to the fact that the length of the packet is not modified, there is no length information stored in the dedicated memory. Likewise, the multiplexer forwards those bytes in the packet buffer corresponding to the IP Source Address field 105 and IP Destination field 106. The multiplexer then switches back to forwarding bytes of information from the dedicated memory when it reaches the TTL and Checksum fields 107 and 108. Lastly, the multiplexer switches again to forwarding bytes from the packet buffer for the duration of the User Data field(s) 109.

Figure 2:
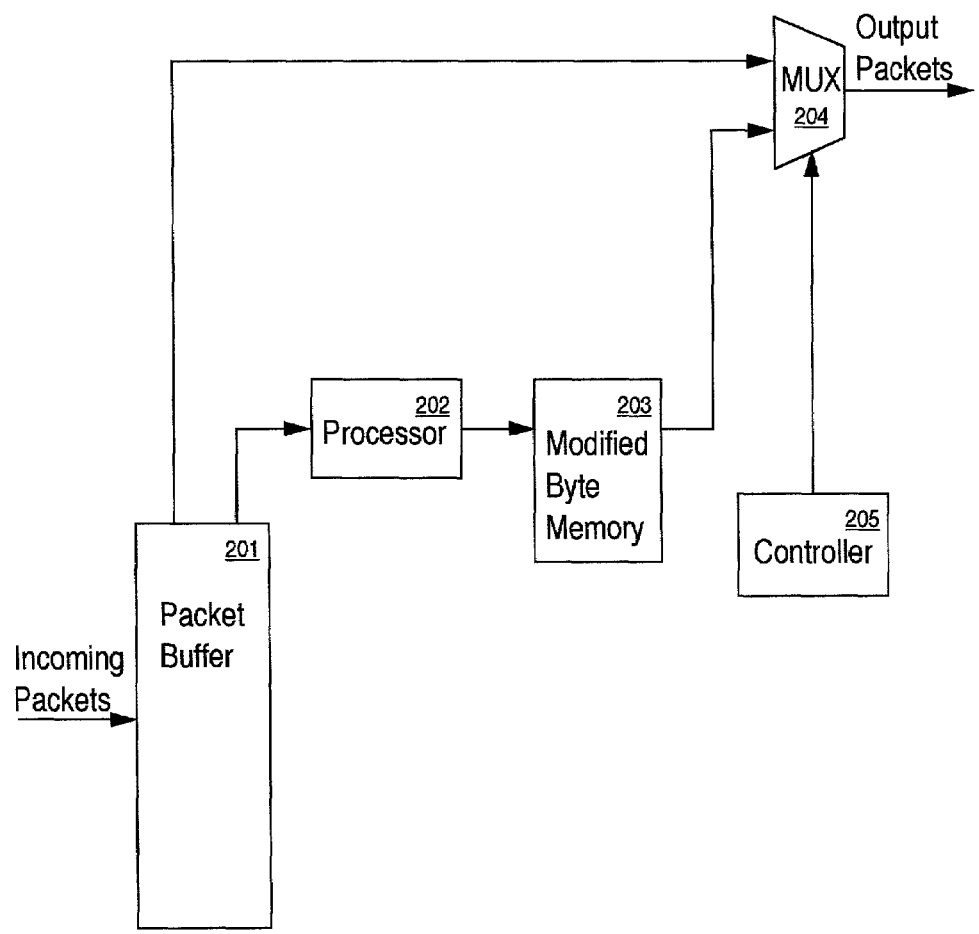
FIG. 2 shows an exemplary circuit which can be used to store, compute, and multiplex modified bytes of information for routing in accordance with one embodiment of the present invention.

FIG. 2 shows an exemplary circuit which can be used to store, compute, and multiplex modified bytes of information for routing in accordance with one embodiment of the present invention. The incoming packets are all stored in the packet buffer 201. Packet buffer 201 can be random access memory (RAM) including, but not limited to, dynamic random access memory (DRAM) and/or static random access memory (SRAM). Other commonly used memories for performing the same function include first-in-first-out (FIFO) memory or input memory. A processor 202 calculates new values for those fields in the packets which need to be modified. In one embodiment, software can be used to calculate the modified bytes. In an alternative embodiment, the processor 202 can be specialized circuitry designed specifically to calculate the modified bytes. Furthermore, the modified bytes can be computed on-the-fly in real-time. Alternatively, the modified bytes can be pre-computed. As a first packet is in the process of being sent out, one or more subsequent packets can have their bytes modified. In other words, packets which are further down in the queue of the packet buffer 201 can be pre-computed. The pre-computed modified bytes are stored in memory 203 and are ready to be sent out at any time. Memory 203 can be DRAM, SRAM, etc. Memory 203 can store a number of modified bytes corresponding to different fields and also different packets. It should be noted that memory 203 is logically separate from that of packet buffer 201. The original packet data is not overwritten. Instead, the modified bytes are stored in a different memory area.

A multiplexer 204 selects bytes of information from either the packet buffer 201 or memory 203. For those fields which do not require any modification, the multiplexer 204 is directed by controller 205 to select the output from packet buffer 201. Otherwise, for those fields which do require modification, the multiplexer 204 is directed by controller 205 to select the output from memory 203. The re-assembled packet containing the original bytes and modified bytes are then sent out of the multiplexer 204.

In one embodiment, controller 205 has information which specifies the locations of bytes of information which need to be modified. This is accomplished by supplying the particular format corresponding to the incoming packets (e.g., the fields, lengths, and/or locations). For example, the relative positions of the fields may change; the locations of the fields may be different; and the number of bytes corresponding to one or more fields can be varied. This formatting information enables the controller to adapt this embodiment of the present invention so that it can handle any type of incoming packets corresponding to present, past, or future protocols. It should be noted that multiplexer 204 can be done in software or can be replaced with a switch which selectively switches between the output from the packet buffer 201 and memory 203.

Figure 3:
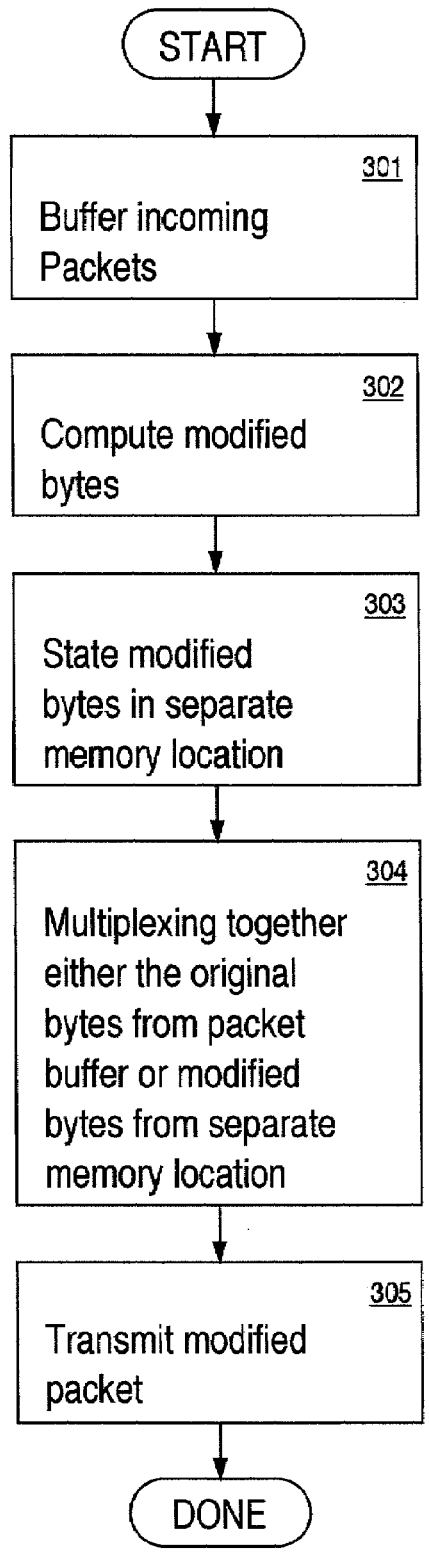
FIG. 3 is a flowchart describing the process of computing, multiplexing, and outputting modified packets in accordance with one embodiment of the present invention.

FIG. 3 is a flowchart describing the process of computing, multiplexing, and outputting modified packets in accordance with one embodiment of the present invention. In step 301, incoming packets are buffered or otherwise temporarily stored. Certain bytes corresponding to the packet are then modified in step 302. In one embodiment, the modified bytes are pre-computed. The modified bytes are stored in a separate memory location in step 303. Note that the original packet is still retained in its unchanged state. The modified bytes are multiplexed together with select bytes from the original packet in step 304. The multiplexed output constitutes the modified packet which is ready for transmission by the router in step 305.

Figure 4:
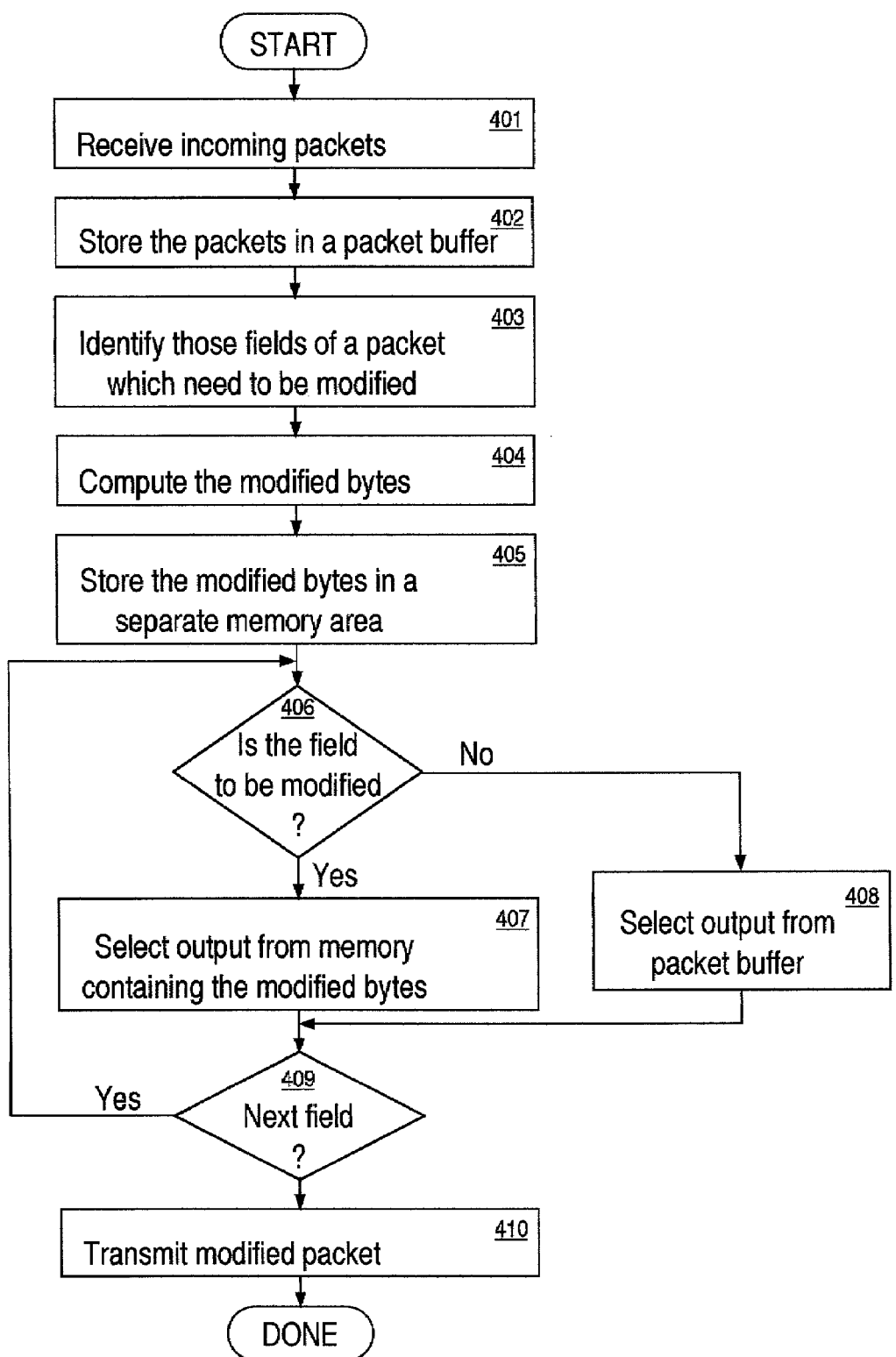
FIG. 4 shows a flowchart which describes the steps for selectively outputting bytes of a packet in a router according to one embodiment of the present invention.

FIG. 4 shows a flowchart which describes the steps for selectively outputting bytes of a packet in a router according to one embodiment of the present invention. Initially, incoming packets are received by the router in step 401. These packets are stored in a packet buffer in step 402. The fields of a packet which need to be modified in order to properly route that particular packet are identified in step 403. New bytes of information are then computed in step 404 corresponding to those fields which need to be modified. The modified bytes are stored in a separate memory area in step 405. When a packet is ready to be forwarded, a determination is made as to whether a particular field needed to be modified in step 406. If that field needed to be modified, the bytes corresponding to that particular field are selected from the separate memory area for output as described in step 407. Otherwise, step 408 shows that if the field did not need to be modified, the bytes of the original received packet corresponding to that particular field are selected for output. Step 409 results in all fields to be processed according to steps 406-408. In the end, the modified packet is transmitted, step 410.

Figure 5:
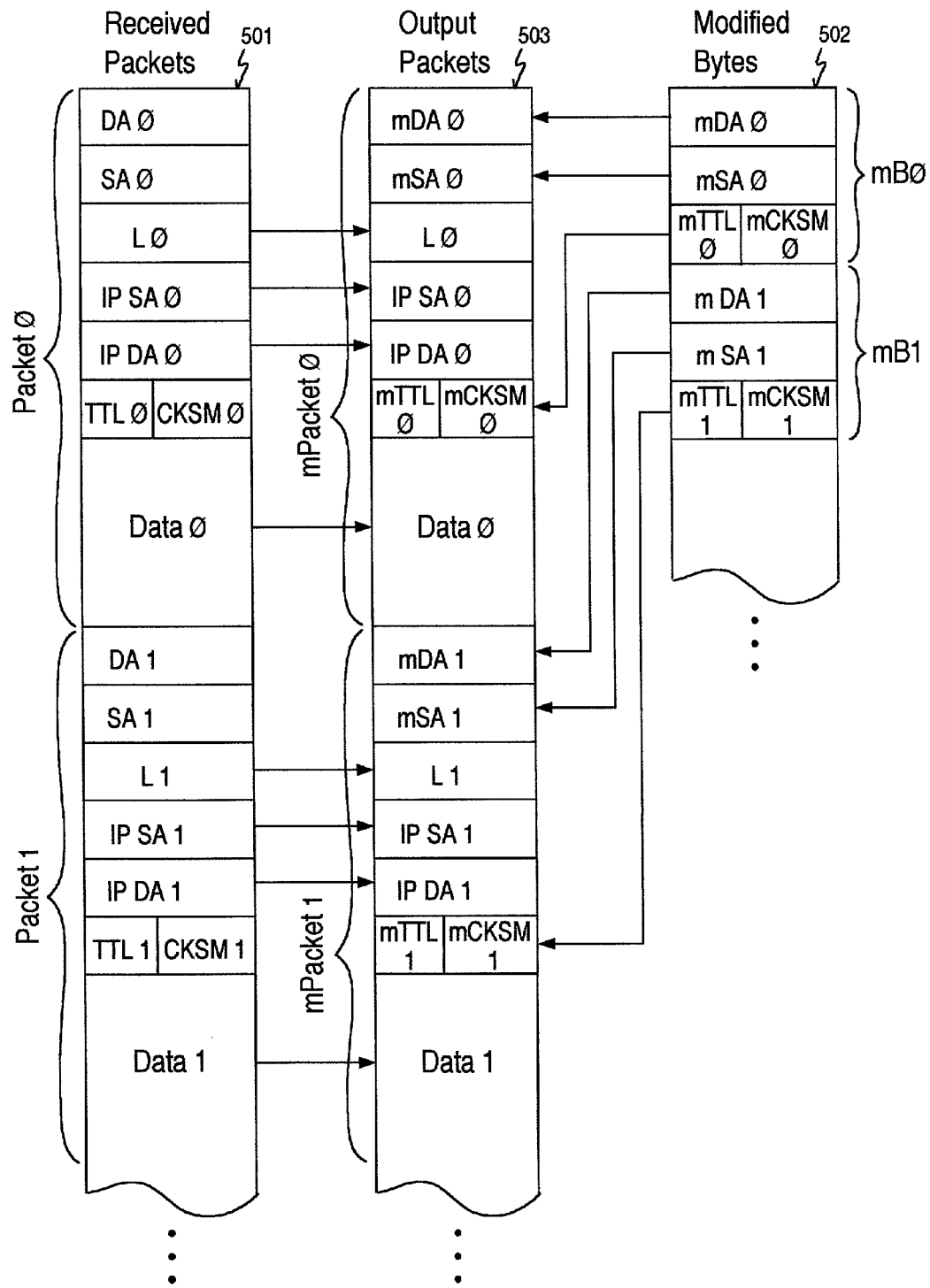
FIG. 5 shows a flow diagram describing in detail how received packets are modified and output according to one embodiment of the present invention.

FIG. 5 shows a flow diagram describing in detail how received packets are modified and output according to one embodiment of the present invention. Packets are buffered in the order received, as depicted by 501. The bytes corresponding to certain fields of the received packets need to be modified. Only the modified bytes are stored in a separate memory location, as indicated by 502. In one embodiment, the present invention selects between certain bytes from the received packets 501 and others from the modified bytes 502 to formulate the modified output packets. The modified output packets are represented in this figure by 503. In relation to the detailed descriptions given above, the received packets reside in the packet buffer; the modified bytes 502 are stored in a separate memory location; and the output packets 503 are output from the multiplexer.

More specifically, a first received packet (e.g., Packet0) contains a Destination Address (DA0), a Source Address (SA0), a Length (L0), an IP Source Address (IP SA0), an IP Destination Address (IP DA0), a Time-to-Live (TTL0), a Checksum (CKSM0), and User Data (Data0). A processor, dedicated hardware circuitry, and/or software is used to compute new values for those fields which need to be modified. Consequently for Packet0, the following modified bytes (mB0) are computed: a modified Destination Address (mDA0), a modified Source Address (mSA0), a modified Time-to-Live (mTTL0), and a modified Checksum (mCKSM0). The modified output packet (mPacket0) is formed by the controlled selection of values from either the received packets (Packet0) or modified bytes (mB0), depending upon whether that field needed to be modified.

Applying this rule, it can be seen that the Destination Address needed to be modified. As such, the first field of mPacket0 is selected from mB0. Consequently, the first field of mPacket0 is mDA0. Likewise, the second field needed to be modified. It follows then that the second field of mPacket0 is mSA0. However, the third field, did not need to be modified. Consequently, the third field of mPacket0 is selected from the received packets 501. The third field correctly contains L0. In similar fashion, the fourth and fifth fields of mPacket0 did not need to be modified. As a result, the IP SA0 and IP DA0 are selected for output as part of mPacket0. But the mTTL0 and mCKSM are selected because they needed to be modified. And the integrity of the User Data needs to be maintained. Hence, User Data0 is appended to mPacket0. In summary, the modified output packet corresponding to the first received packet correctly contains a modified Destination Address (mDA0); a modified Source Address (mSA0); an unmodified Length (L0); an unmodified IP Source Address (IP SA0); an unmodified IP Destination Address (IP DA0); a modified TTL (mTTL0); a modified Checksum (mCKSM); and unmodified User Data (Data0).

This process can be repeated for successive packets. For example, modified bytes (mB1) can be pre-computed for a second packet (Packet1) to generate a modified output packet (mPacket1).

Thus, an apparatus and method for computing, storing, and multiplexing modified bytes in a packet router is described. While the present invention has been described in particular embodiments, it should be appreciated that the present invention should not be construed as limited by such embodiments, but rather construed according to the below claims.

What is claimed is:

1. A method for generating a modified packet for output from a router, comprising:
   storing a received packet in a first memory;
   computing modified bytes corresponding to predetermined fields of said packet;
   storing said modified bytes in a second memory;
   multiplexing selected unmodified bytes corresponding to said packet stored in said first memory with said modified bytes in said second memory to generate said modified packet;
   storing an unmodified Length, an unmodified IP Source Address, an unmodified IP Destination Address, and unmodified Data in said first memory;
   storing a modified Destination Address, a modified Source Address, a modified Time-to-Live and a modified Checksum in said second memory; and
   selectively outputting said modified Destination Address, said modified Source Address, said unmodified Length, said unmodified IP Source Address, said unmodified IP Destination Address, said modified Time-to-Live, said modified Checksum, and said unmodified Data.

2. The method of claim 1, further comprising:
pre-computing said modified bytes and storing pre-computed modified bytes in said second memory.

3. The method of claim 1, further comprising:
adaptively modifying selected bytes of said packet in accordance with a pre-determined format of said packet.

4. A device comprising:
a first memory for storing an incoming packet;
a processor coupled to said first memory which computes modified bytes corresponding to pre-determined fields of said packet;
a second memory coupled to said first memory, wherein said modified bytes are stored in said second memory; and
a multiplexer coupled to said first memory and said second memory, wherein said multiplexer multiplexes bytes selected from either said first memory or said second memory,
wherein said first memory contains an unmodified Length, an unmodified IP Source Address, an unmodified IP Destination Address, and unmodified Data; and
wherein said second memory contains a modified Destination Address, a modified Source Address, a modified Time-to-Live, and a modified Checksum.

5. The device of claim 4, further comprising a controller coupled to said multiplexer, wherein said controller specifies whether bytes from said first memory or bytes from said second memory are to be selected for output.

6. The device of claim 5, wherein said controller adaptively controls said multiplexer according to a pre-determined format corresponding to said packet.

7. The device of claim 4, wherein said multiplexer selects bytes corresponding to those fields of said packet which need to be modified from said second memory and said multiplexer selects bytes corresponding to those fields of said packet which do not need to be modified from said first memory.

8. The device of claim 4, wherein said multiplexer outputs a modified packet comprised of said modified Destination Address, said modified Source Address, said unmodified Length, said unmodified IP Source Address, said unmodified IP Destination Address, said modified Time-to-Live, said modified Checksum, and said unmodified Data.

9. The device of claim 4, wherein said processor pre-computes said modified bytes.

10. A method for outputting a modified packet, comprising:
storing a received packet in a first memory location, wherein said packet comprises a plurality of fields, each of said fields having an associated value;
generating modified values corresponding to pre-determined fields of said received packets;
storing said modified values in a second memory location which is different from where unmodified values of said packet is stored in said first memory location; and
selecting either said modified values from said second memory location or unmodified values of said packet from said first memory location for output,
wherein each of said fields comprising said received packet in said first memory location is from a group comprising: Length, an unmodified IP Source Address, an unmodified IP Destination Address, and unmodified Data; and
wherein each of said fields corresponding to said modified values in said second memory location is from a group comprising: a modified Destination Address, a modified Source Address, a modified Time-to-Live, and a modified Checksum.

11. The method of claim 10, wherein said selecting is performed by switching between an unmodified value in said first memory and a modified value in said second memory.

12. The method of claim 10, wherein said second memory contains a plurality of pre-computed modified values.

13. An apparatus for routing a packet, comprising:
means for buffering a received packet in a first memory;
means for calculating a different value for one field of said received packet, and storing the calculated different value in a second memory; and
means for selecting either an original value of said packet from the first memory for output or said different value from the second memory for output.
wherein said received packet in said first memory comprises a plurality of fields, each of said fields in said plurality of fields is from a group comprising: Length, an unmodified IP Source Address, an unmodified IP Destination Address, and unmodified Data; and
wherein each of said calculated different values stored in said second memory corresponds to a field, said field from a group comprising: a modified Destination Address, a modified Source Address, a modified Time-to-Live, and a modified Checksum.

14. The apparatus of claim 13, further comprising means for retaining both said original value corresponding to said field of said received packet and said different value also corresponding to said field of said received packet.

15. The apparatus of claim 13, further comprising means for pre-computing said different value.

16. The apparatus of claim 13, further comprising means for generating modified packets without overwriting packet data.

* * * * *

UNITED STATES PATENT AND TRADEMARK OFFICE
CERTIFICATE OF CORRECTION

PATENT NO. : 7,570,642 B2
APPLICATION NO. : 10/092155
DATED : August 4, 2009
INVENTOR(S) : Lavigne et al.

It is certified that error appears in the above-identified patent and that said Letters Patent is hereby corrected as shown below:

In column 8, line 30, in Claim 13, delete "output." and insert -- output, --, therefor.

Signed and Sealed this

Twenty-third Day of February, 2010

David J. Kappos
*Director of the United States Patent and Trademark Office*